United States Patent [19]

Morinaga et al.

[11] Patent Number: 4,564,153

[45] Date of Patent: Jan. 14, 1986

[54] RETRACTOR

[75] Inventors: Masaru Morinaga, Yamato; Shinobu Mogi, Fujisawa, both of Japan

[73] Assignee: NSK-Warner K.K., Tokyo, Japan

[21] Appl. No.: 559,212

[22] Filed: Dec. 8, 1983

[30] Foreign Application Priority Data

Dec. 16, 1982 [JP] Japan ............................ 57-189214[U]
Jul. 29, 1983 [JP] Japan ............................ 58-117136[U]

[51] Int. Cl.[4] ...................... A62B 35/00; B65H 75/48
[52] U.S. Cl. .................................................. 242/107
[58] Field of Search ...................... 242/107, 107.4 R; 280/806–808; 297/475–480

[56] References Cited

U.S. PATENT DOCUMENTS

| | | | |
|---|---|---|---|
| 4,205,807 | 6/1980 | Shimogawa et al. | 242/107 |
| 4,342,435 | 6/1982 | Yanagihara | 242/107 |
| 4,382,563 | 5/1983 | Morita et al. | 242/107 |

Primary Examiner—John M. Jillions
Attorney, Agent, or Firm—Shapiro and Shapiro

[57] ABSTRACT

A retractor has a webbing take-up shaft rotatably supported by a base, biasing device for biasing the take-up shaft in a webbing take-up direction, a connecting member for connecting one part and another part of the biasing device, a locking member capable of assuming a locking position engaging the connecting member and a non-locking position disengaging from the connecting member, and a control device for controlling the locking member. When the locking member assumes the locking position, the biasing force of the other part of the biasing device is prevented from acting on the take-up shaft, and when the locking member assumes the non-locking position, the biasing forces of both parts of the biasing device are permitted to act on the take-up shaft.

9 Claims, 8 Drawing Figures

RETRACTOR

BACKGROUND OF THE INVENTION

1. Field of the Invention

This invention relates to a retractor with a take-up force reducing device which reduces tension in a take-up direction applied to a webbing during the wearing of the webbing and prevents any excessive pressure force from being applied to the webbing wearer's body.

2. Description of the Prior Art

Generally, a biasing force of considerable intensity in a take-up direction is applied to a take-up shaft in order that webbing drawn out from the retractor for wearing may be again fully taken up onto the take-up shaft in the retractor. Therefore, even during the wearing of the webbing, a strong biasing force in the take-up direction is applied to the webbing and a pressure force of considerable intensity is applied to the wearer, and this gives the wearer a sense of displeasure which forms a cause for the seat occupant to be unwilling to wear the seat belt in spite of the fact that wearing the seat belt is desirable in ensuring safety.

To solve this, it has been proposed to provide a retractor with a take-up force reducing device which places a part of biasing means for biasing the webbing into non-operative condition during the wearing of the webbing so as not to act on the take-up shaft and causes it to recover its operative condition when it is necessary to take up the webbing onto the take-up shaft in the retractor. In this case, however, there is a problem in that when the wearer tries to move and draw out the webbing while the reducing device is working, the reducing device acts as a strong resistance to the draw-out of the webbing and considerably hampers free movement of the wearer.

In order not to hamper free movement of the wearer, it has also been proposed to cause the reducing device to modify its operative condition intermittently and thereby lessen the resistance to the draw-out of the webbing, but in this case, the sound produced by impact or friction between the reducing device and a member on which it acts is a problem.

Further, in such a reducing device having a construction in which the biasing means for biasing the webbing is divided into a plurality of portions and these portions are coupled together by a connecting member, when the biasing means rapidly changes its condition, it may assume an abnormal form and may be urged against the take-up shaft or the connecting member to cause various inconvenient phenomena such as unsatisfactory take-up and the like.

SUMMARY OF THE INVENTION

Accordingly, it is a first object of the present invention to solve the above-noted two problems at the same time and to provide a retractor designed such that even if webbing is drawn out when the reducing device is in its take-up force reducing operation, the reducing device will shift into a condition which will permit smooth draw-out of the webbing accompanied by no unpleasant sound.

It is a second object of the present invention to provide a retractor with a take-up force reducing device which is designed to operate always normally even if the condition of the biasing means divided into a plurality of portions is rapidly changed.

The invention will become fully apparent from the following detailed description thereof taken in conjunction with the accompanying drawings.

DESCRIPTION OF THE PREFERRED EMBODIMENTS

Figure 1:
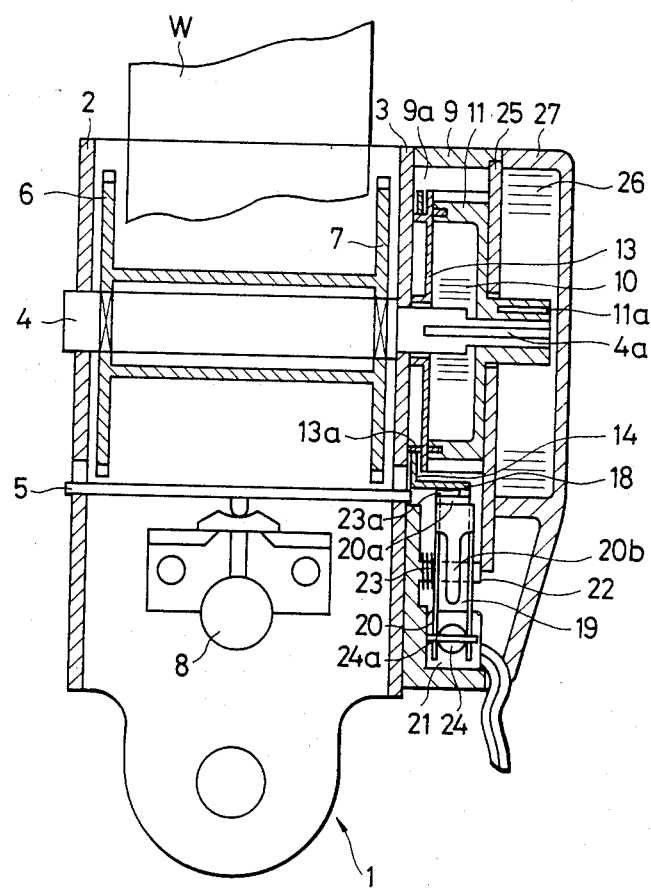
FIG. 1 is a front cross-sectional view of a first embodiment of the present invention.

A first embodiment of the present invention will hereinafter be described by reference to FIGS. 1 to 4. Between the opposite side plate portions 2 and 3 of a base member 1, a take-up shaft 4 is rotatably supported and a brake 5 is tiltably supported. The brake 5 locks the rotation of the take-up shaft 4 in a webbing draw-out direction when it meshes with a pair of latch plates 6 and 7 which are integral with the take-up shaft 4. This brake 5 is brought down in a direction to mesh with the latch plates 6 and 7 when a pendulum 8 swings, sensing a speed change of a vehicle or the like.

A mount 9 is secured to the side plate portion 3, and an auxiliary take-up spring 10 having a relatively weak take-up spring force, a ratchet wheel 11 as a connecting member, a stopper wheel 13 mounted on the side plate portion 3 side integrally with the ratchet wheel, and a lever stopper 14 as a cam member fitted to the cylindrical portion 13a of the stopper wheel so as to be frictionally engaged therewith are provided in a portion wherein a generally circular hole 9a is formed. The inner end of the auxiliary take-up spring 10 is secured to a slit 4a and the outer end of the auxiliary take-up spring 10 is secured to the inner wall of the ratchet wheel 11. The ratchet wheel 11 is of a cup-like shape, and the spring 10 is contained therein and the outer peripheral surface thereof is formed with a plurality of teeth 16 each having an engaging surface 15 facing in a webbing take-up direction. The lever stopper 14 has a radially extending projection 17 on which an axially extending pin 18 is studded. The lever stopper 14 is disposed in the hole 9a of the mount 9 and is pivotable with the stopper wheel 13, and the ratchet wheel 11, in the range in which the projection 17 of the lever stopper 14 strikes against the opposite ends of the protrusion 9b of the hole 9a.

Figure 2:
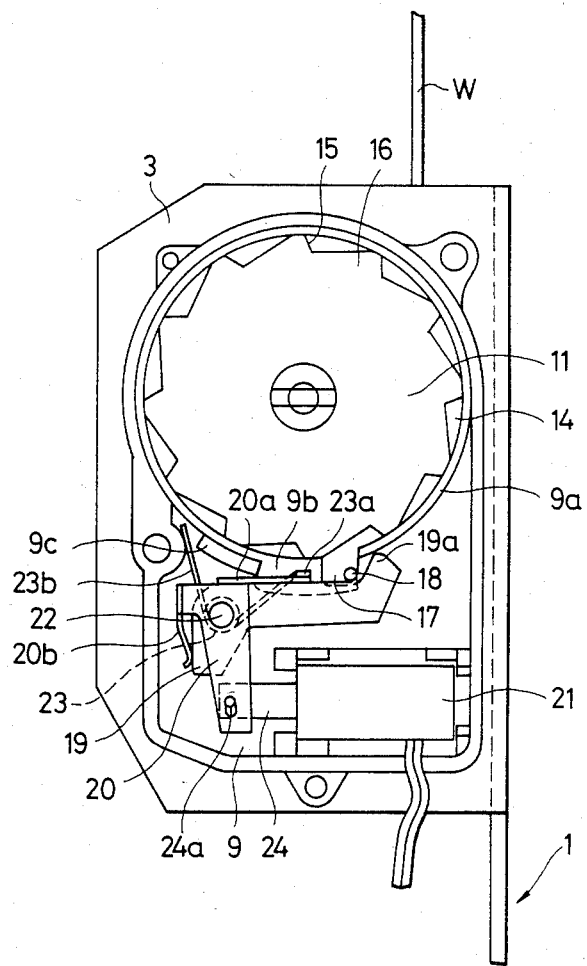
FIGS. 2 to 4 are side views with some parts removed for illustrating the operation of the first embodiment.

Referring to FIG. 2, a stop lever 19 and a stop spring 20 which form a locking means and a solenoid 21 for controlling the locking means are provided in the lower portion of the mount 9. The stop lever 19 and the stop spring 20 which is formed of a resilient material are pivotably supported by a strut 22 formed integrally with the mount 9, and a first protrusion 20a and a second protrusion 20b of the stop spring 20 are in contact with the right portion and the left portion, respectively, of the stop lever 19 as viewed in FIG. 2. A return spring 23 is disposed around the strut 22, and one leg portion 23a thereof bears against the first protrusion 20a of the stop spring 20 while the other leg portion 23b thereof bears against the inner wall of the mount 9. Thus, the return spring 23 biases the stop spring 20 to turn rightwardly in FIG. 2 and also biases the stop lever 19 to turn rightwardly through the first protrusion 20a. The lower end of the stop spring 20 is coupled to the plunger 24 of a solenoid 21 through a pin 24a. This coupled portion is provided with some play so as to permit movement thereof within some range. Thus, when the solenoid 21 is energized, the plunger 24 is attracted and the stop spring 20 and the stop lever 19 are turned leftwardly against the spring force of the return spring 23, whereby the pawl portion 19a of the stop lever 19 is brought to a locking position in which it is engageable with a tooth 16 of the ratchet wheel 11. When the solenoid 21 is deenergized, the attraction is nullified and the stop spring 20 and the stop lever 19 are turned rightwardly by the spring force of the return spring 23, whereby the pawl portion 19a of the stop lever 19 is brought to a non-locking position in which it is unengageable with a tooth 16 of the ratchet wheel 11. The stop spring 20 and the stop lever 19 are engaged with each other as described above and therefore, in the locking position, when a force in the directon of a rightward turn is applied to the stop lever 19, this stop lever 19 may be turned rightwardly while flexing the second protrusion 20b of the stop spring 20 leftwardly.

On the outer side of the ratchet wheel 11, a partition plate 25 is provided on the side walls and supporting portion 9c of the mount 9, and a main take-up spring 26 having a relatively strong spring force and having the inner end thereof secured to the slit 11a in the shaft portion of the ratchet wheel 11 is provided on the partition plate 25. The outer end of the main take-up spring 26 is secured to the inner wall of a spring case 27 which in turn is secured to the mount 9. A pre-charge is applied to the main take-up spring 26 and therefore, when assembled, the auxiliary take-up spring 10 is fully charged and the main take-up spring 26 is in a somewhat pre-charged condition, as is apparent from FIG. 1. The supporting portion 9c of the mount 9 also functions to control one end of the range of pivotal movement of the lever stopper 14.

Operation of the first embodiment will now be described on the basis of the above-described construction.

Figure 3:
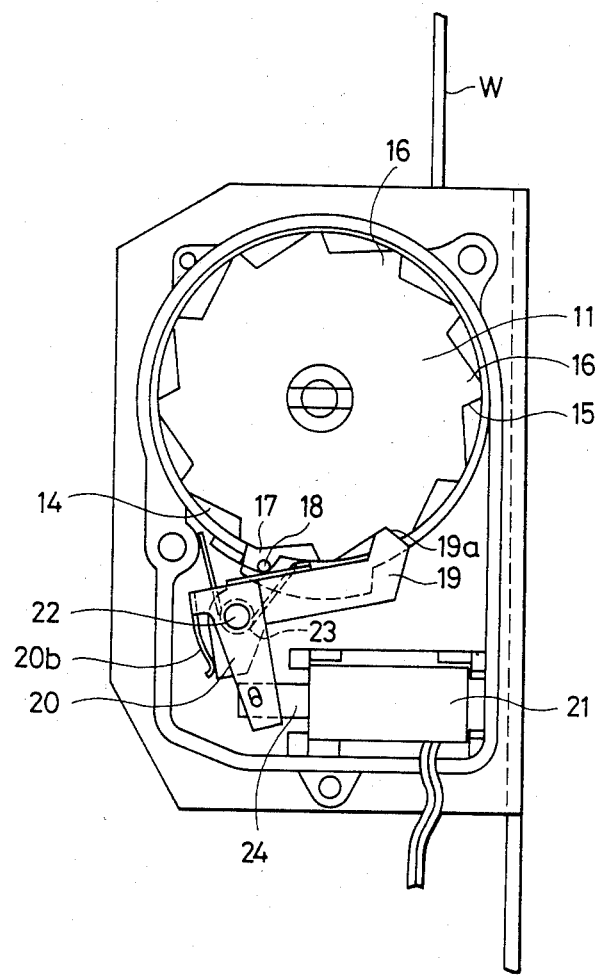

When webbing W is being drawn out as shown in FIG. 2, the solenoid 21 is in its deenergized condition and the plunger 24 is not attracted and accordingly, the stop lever 19 and the stop spring 20 are in the non-locking position. Consequently, the movement of the ratchet wheel 11 in the take-up direction is not restrained and the biasing force of the main take-up spring 26 in the take-up direction is applied to the take-up shaft 4. Thus, if the draw-out force of the webbing W is eliminated in the course of draw-out, the whole amount of webbing is taken up around the take-up shaft 4 because a sufficiently great take-up force is acting on the webbing. In FIG. 3, the lever stopper 14 is in its most leftwardly turned condition in which the projection 17 bears against the right end of the protrusion 9b of the hole 9a, and this is because, as the take-up shaft 4 rotates in the draw-out direction, the ratchet wheel 11 and the stopper wheel 13 are rotated in the draw-out direction and further the lever stopper 14 is rotated in the draw-out direction by the action of frictional engagement. Accordingly, if the webbing W is rewound after being drawn out, the lever stopper 14 will be turned rightwardly as viewed in FIG. 2 and the projection 17 will come to bear against the left end of the protrusion 9b of the hole 9a.

When the webbing W is drawn out by a suitable amount and the seat occupant wears the webbing with a buckle, not shown, being brought into mesh engagement therewith, the solenoid 21 is energized and its attraction acts on the plunger 24. Along therewith, the stop spring 20 and the stop lever 19 try to turn leftwardly about the strut 22, but such leftward turn is blocked by the pin 18 with the lever stopper 14 being still in the position of FIG. 2 at this time. However, when the webbing W is somewhat rewound so as to take up the slack portion of the webbing, the lever stopper 14 comes to the position of FIG. 3 and at this position (set position), said blocking is released. Thus, the stop spring 20 and the stop lever 19 come to the locking position, whereupon the rotation of the ratchet wheel 11 in the take-up direction is restrained and the spring force of the main take-up spring 26 no longer acts on the take-up shaft 4. That is, in this condition in which the take-up force has been reduced, only the weak spring force of the auxiliary take-up spring 10 is acting and therefore, a great pressure force is not applied to the webbing wearer to thereby ensure comfortable wearing. Each tooth 16 of the ratchet wheel 11 is formed with an angle of relief (the angle formed between the engaging surface 15 and a straight line passing through the center of the ratchet wheel 11 and the bottom of the tooth) and therefore, in the position of FIG. 3, a certain degree of force which tends to bring the stop lever 19 toward the non-locking position is acting on the stop lever 19, but the spring force of the second protrusion 20b of the stop spring 20 and the attraction of the solenoid 21 are suitably set so that the stop lever 19 is not moved toward the non-locking position by such degree of force.

When the solenoid 21 is deenergized with the buckle being disengaged, the attraction of the solenoid 21 is nullified and the stop spring 20 and the stop lever 19 are quickly returned to the non-locking position by the spring force of the return spring 23 as well as with the aid of the aforementioned angle of relief. Only the weak spring force acts on the take-up shaft 4 until the auxiliary take-up spring is fully charged, but once the auxiliary take-up spring has been fully charged, the webbing W is reliably taken up by the strong force of the main take-up spring 26.

Figure 4:
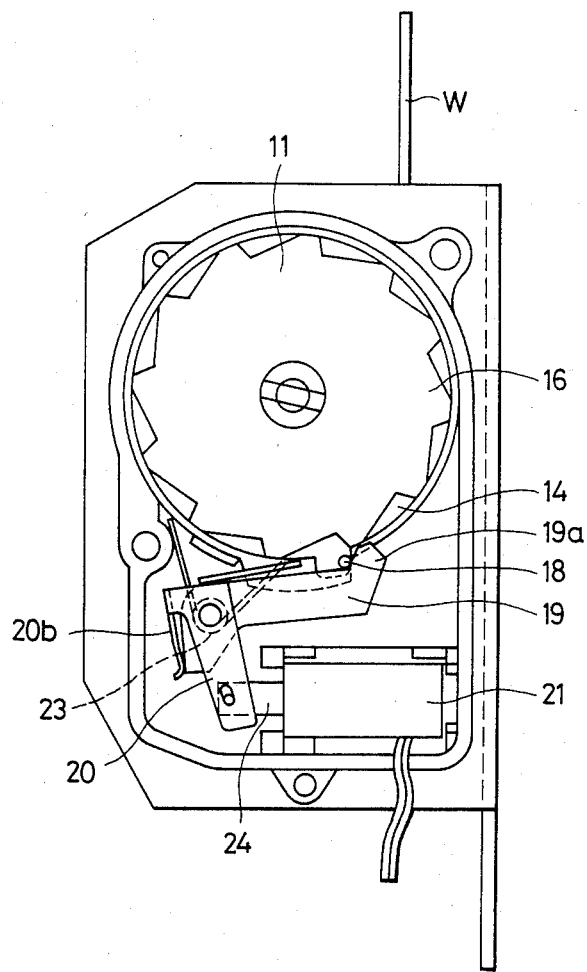
Figure 5:
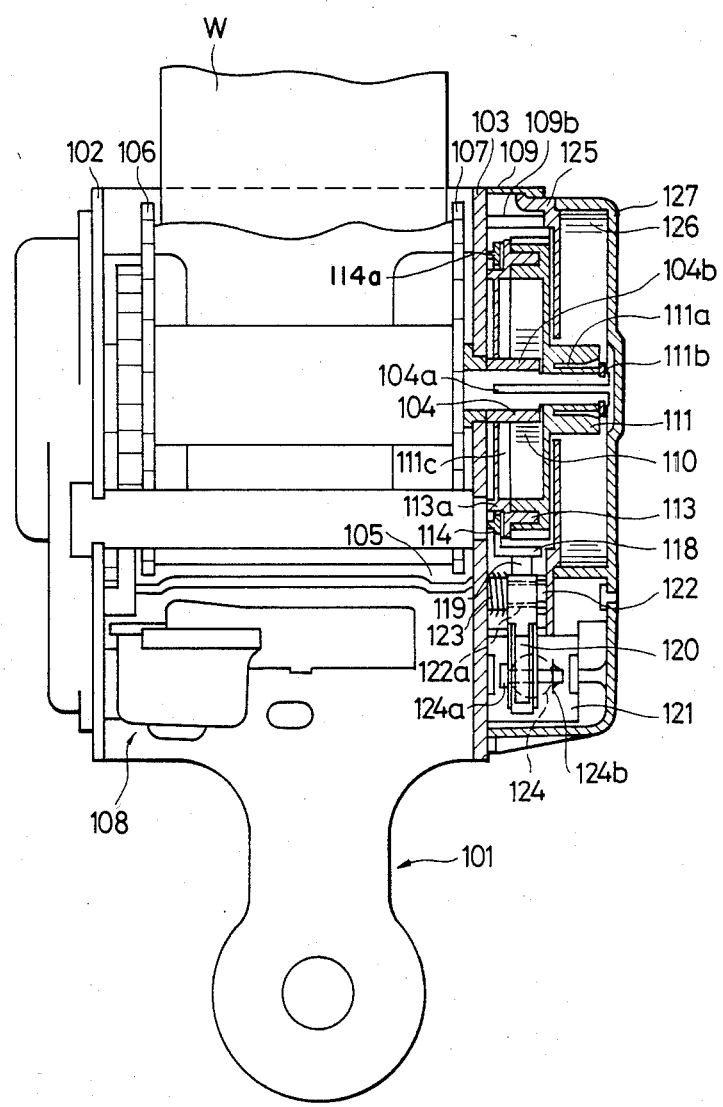
FIG. 5 is a front cross-sectional view of a second embodiment of the present invention.

On the other hand, when one tries to draw out the webbing W in the position of FIG. 3, the ratchet wheel 11 and the stopper wheel 13 begin to rotate in the draw-out direction with the take-up shaft 4 and further, the lever stopper 14 is turned rightwardly due to the action of frictional engagement and tries to come to the position of FIG. 4. The force the pin 18 of the lever stopper 14 applies to the stop lever 19 at this time is set to a value greater than the spring force of the second protrusion 20b of the stop spring 20. Accordingly, in this process, the pin 18 turns only the stop lever 19 rightwardly while flexing the second protrusion of the stop spring 20 leftwardly, with the stop spring 20 and the plunger 24 remaining in the position of FIG. 3, whereby the pawl portion 19a is brought to the position in which it is unengageable with a tooth 16 of the ratchet wheel 11. Thus, the webbing W is smoothly drawn out without any unpleasant sound which would otherwise be produced by the stop lever 19 intermittently striking against the ratchet wheel 11, thus permitting the wearer to move freely. At this time, no unreasonable force is applied to the solenoid 21 and the solenoid is not affected and thus, it never gets out of order.

Now, the following modifications or changes, for example, can be made to the above-described first embodiment.

In the first embodiment, with the stop lever 19 and the stop spring 20 forming a locking member, it is only the stop lever 19 having a portion engaged with the ratchet wheel 11 that is brought from the locking position to the non-locking position by the lever stopper 14, which is a cam member. However the locking member may also be made unitary such that when a force which tends to bring the locking member toward the non-locking position is applied thereto from the cam member when the locking member is in the locking position, the entire locking member is moved about the coupling portion between the locking member and the plunger 24, for example, whereby the locking member is retracted to the non-locking position.

Also, the locking member may be made unitary and a mechanism for enabling the aforementioned retracting movement, constituted by a spring member or the like, may be provided in the coupling portion between the locking member and the plunger 24.

In the first embodiment, the locking member is biased toward the non-locking position by the return spring 23, but alternatively, such biasing means may not be provided and for example, a pair of solenoids may be provided and alternately energized to control the locking member. Also, the energization of the solenoids, which are control means, may be operatively associated not only with the engagement of the buckle but also with the closing of the door, the depression of the engine key or a seat switch.

In the first embodiment, the lever stopper 14, which is a cam member, is in frictional engagement with the stopper wheel 13 forming a part of the connecting member of the springs 10 and 26 and is movable in a predetermined range in response to the take-up shaft 4, but alternatively, the lever stopper 14 may be in direct frictional engagement with the take-up shaft 4.

Thus, according to the first embodiment, the cam member is provided and the design is such that the locking member effects unique movement and therefore, by a relatively simple construction, it is possible that the webbing is smoothly drawn out without any unpleasant sound being produced when the seat occupant wears the webbing.

Reference is now had to FIGS. 5 to 8 to describe a second embodiment of the present invention. Between the opposite side plate portions 102 and 103 of a base member 101, a take-up shaft 104 is rotatably supported and a brake 105 is tiltably supported. The brake 105 locks the rotation of the take-up shaft 104 in a webbing draw-out direction when it meshes with a pair of latch plates 106 and 107 which are integral with the take-up shaft 104. This brake 105 is brought down in a direction to mesh with the latch plates 106 and 107 when a vehicle body sensing mechanism 108 swings, sensing a speed change of a vehicle or the like.

Figure 6:
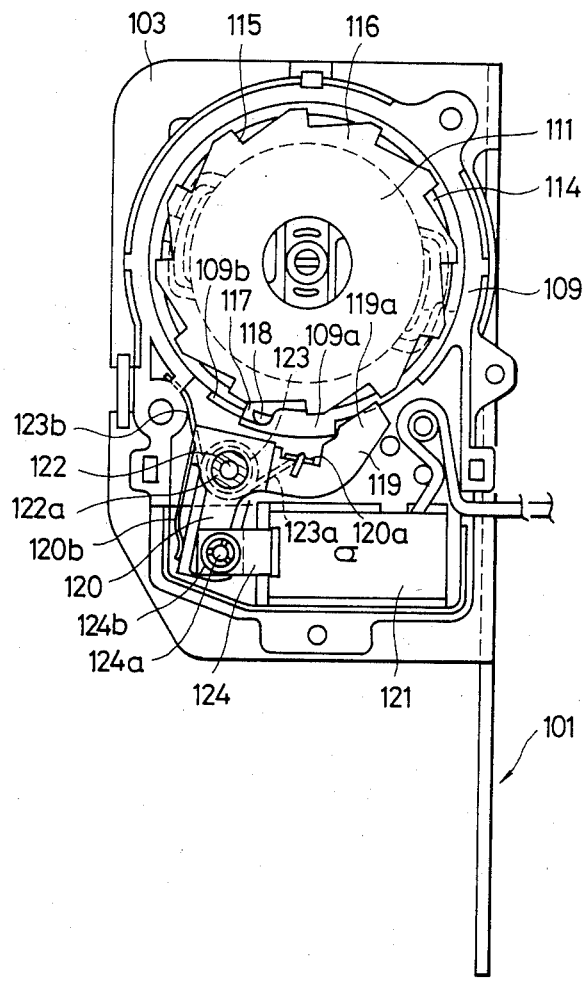
FIGS. 6 to 8 are side views with some parts removed for illustrating the operation of the second embodiment.

A case 109 is secured to the side plate portion 103, and an auxiliary take-up spring 110 having a relatively weak take-up spring force, a ratchet wheel 111 as a connecting member, a stopper wheel 113 attached integrally thereto on the side plate portion 103 side, and a lever stopper 114 fitted in the cylindrical portion 113a of the stopper wheel 113 so as to be frictionally engaged therewith are provided within the case 109. The inner end of the auxiliary take-up spring 110 is secured to the slit 104a of the take-up shaft 104 and the outer end of the auxiliary take-up spring 110 is secured to the inner wall of the ratchet wheel 111. The auxiliary take-up spring mounting portion is oval-shaped and therefore the auxiliary take-up spring 110 may be broken and accordingly, there is mounted a circular retainer 104b around which the auxiliary take-up spring 110 is disposed. The ratchet wheel 111 is of a cup-like shape and the spring 110 is contained in the ratchet wheel, and the outer peripheral surface of the ratchet wheel is formed with a plurality of teeth 116 each having an engaging surface 115 facing in a webbing take-up direction. The ratchet wheel 111 is rotatable relative to the take-up shaft 104 by a Seger clip 111b mounted in a groove formed in the take-up shaft 104, but is immovable in the axial direction, whereby it is not deformable into a bamboo shoot shape or the like even if the auxiliary take-up spring 110 is rapidly charged. Also, the cup-like portion 111c is made sufficiently large to increase the degree of freedom of the auxiliary take-up spring 110 to thereby prevent this spring when rapidly charged from striking against the inner surfaces of the stopper wheel 113 and ratchet wheel 111 to cause a "stretch" phenomenon. The lever stopper 114 has a radially extending projection 117 on which an axially extending pin 118 is studded. The lever stopper 114 is rotatable with the stopper wheel 113 and thus with the ratchet wheel 111 in a range over which the projection 117 thereof strikes against the opposite ends of a sector hole 109a (FIG. 6). Also, the lever stopper 114 has a circular linear projection 114a which is in contact with the side plate portion 103.

Referring to FIG. 6, a stop lever 119 and a stop spring 120 as locking means and a solenoid 121 for controlling the locking means are provided in the lower portion of the side plate portion 103. The stop lever 119 and the stop spring 120, which is formed of a resilient material, are both pivotably supported by a strut 122 studded in the side plate portion 103, and a first protrusion 120a and a second protrusion 120b of the stop spring 120 are in contact with the right portion and the left portion, respectively, of the stop lever 119 as viewed in FIG. 6. An iron collar 122a is fitted around the strut 122 to prevent the cutting of the latter and also a return spring 123 is disposed around the strut. One leg portion 123a of the return spring 123 bears against the first protrusion 120a of the stop spring 120 and the other leg portion 123b of the return spring 123 bears against the inner wall of the case 109. Thus, the return spring 123 biases the stop spring 120 to turn rightwardly in FIG. 6 and also biases the stop lever 119 to turn rightwardly through the first protrusion 120a. The lower end of the stop spring 120 is coupled to the plunger 124 of the solenoid 121 through a headed pin 124a and a retaining ring 124b. Thus, the pin 124a is not disengaged and thereby ensures the coupling of the two members 120 and 124. This coupling portion is provided with some play so as to permit movement in some range.

On the outer side of the ratchet wheel 111, a set plate 125 mounted in a snap-in fashion so as to permit subassembly during assembly is provided on a side wall and the supporting portion 109b of the case 109, and a main take-up spring 126 having a relatively strong spring force and having the inner end thereof secured to the slit 111a in the shaft portion of the ratchet wheel 111 is provided on the set plate 125. The outer end of the main take-up spring 126 is secured to the inner wall of a spring case 127 which in turn is secured to the case 109. The spring forces of the main take-up spring 126 and the auxiliary take-up spring 110 which constitute biasing means have such a relation that the spring force of the main take-up spring 126 is greater than that of the auxiliary take-up spring 110 as described above. Accordingly, if pre-charge or pre-load is applied to the main take-up spring 126, the auxiliary take-up spring 110 having a weak spring force will first be fully wound around the retainer 104b through the ratchet wheel 111, and then the main take-up spring 126 will be gradually taken up. When assembled, as is apparent from FIG. 5, the auxiliary take-up spring 110 is fully wound and the main take-up spring 126 also is in somewhat precharged condition. One supporting portion 109b (FIG. 6) of the case 109 also functions to control one end of the range of pivotal movement of the lever stopper 114.

Operation of the second embodiment will now be described on the basis of the above-described construction.

FIG. 6 shows the condition of the draw-out process of the webbing W. In FIG. 6, the lever stopper 114 is in its most leftwardly turned position in which the projection 117 bears against the left end of the sector hole 109a, and this position has been brought about as follows: as the take-up shaft 104 rotates in the draw-out direction, the ratchet wheel 111 and the stopper wheel 113 rotate in the draw-out direction and further, due to the action of frictional engagement, the lever stopper 114 is rotated in the draw-out direction and the webbing is rewound after being drawn out, whereby the lever stopper 114 is turned rightwardly as viewed in FIG. 6 and thus, the projection 117 comes to bear against the left end of the sector hole 109a.

Figure 7:
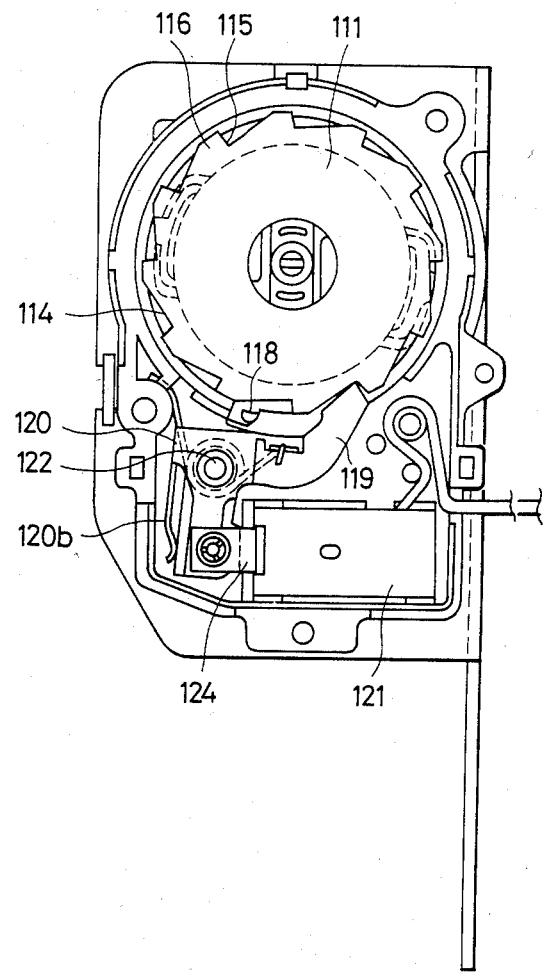

FIG. 7 shows a condition corresponding to the FIG. 3 condition of the first embodiment.

With the retractor in the condition of FIG. 7, when the solenoid 121 is deenergized with the buckle disengaged, the attraction of the solenoid 121 is nullified and the stop spring 120 and the stop lever 119 are quickly returned to the non-locking position by the spring force of the return spring 123 and with the aid of the aforementioned angle of relief. Thereupon, the auxiliary take-up spring 110 is rapidly wound around the retainer 104b by the main take-up spring 126 having a much stronger spring force. However, even if the auxiliary take-up spring 110 is rapidly wound, it never happens that this spring is deformed into a bamboo shoot shape and urges the ratchet wheel 111 toward the set plate 125 and the take-up shaft 104 toward the opposite side to cause unsatisfactory take-up which would otherwise result from the frictional contact thereof with another portion. This is because the space for containing the auxiliary take-up spring 110 therein is made large and the ratchet wheel 111 is made axially immovable to thereby prevent a "stretch" phenomenon. Only a weak spring force acts on the take-up shaft 104 until the auxiliary take-up spring 110 is wound fully, but once the auxiliary take-up spring 110 has been fully wound, the webbing W is reliably taken up by the strong spring force of the main take-up spring 126.

Figure 8:
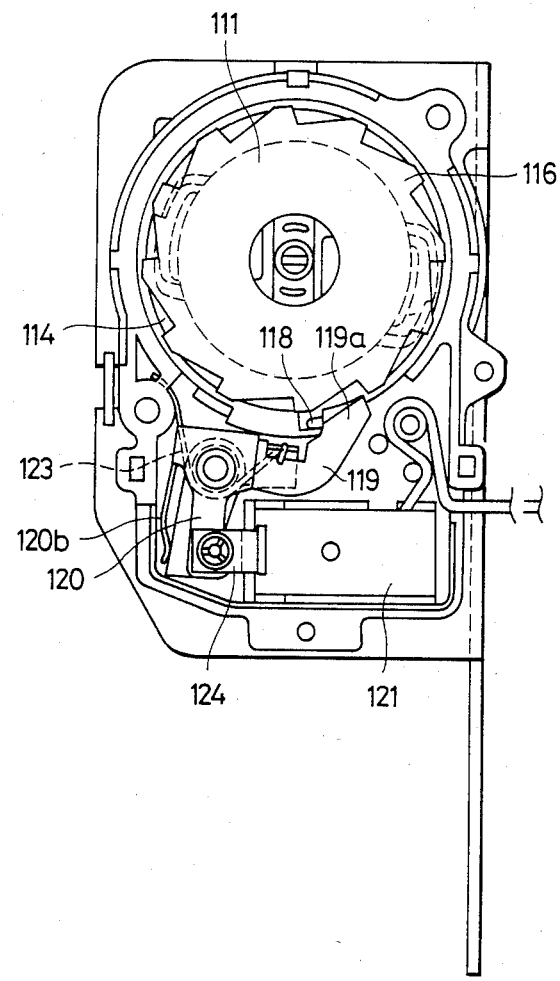

When one tries to draw out the webbing W in the condition of FIG. 7, the condition of FIG. 8 corresponding to the FIG. 4 condition of the first embodiment is about to be brought about.

When the webbing W is rewound from the condition of FIG. 8, the pin 118 moves and thereby the condition of FIG. 7 is restored and thus, the spring force of the main take-up spring 126 acts no longer. Accordingly, this position provides a set position and the pressure force applied to the seat occupant is reduced when the webbing is further rewound. Thereafter, when the seat occupant moves forward, the pressure force is weak until the aforementioned set position is reached, but in this position, the auxiliary take-up spring 110 is fully wound and the take-up shaft 104 and the ratchet wheel 111 begin to rotate together. Accordingly, when the webbing W is further drawn out, the pin 118 of the lever stopper 114 which is in frictional engagement with the ratchet wheel 111 is moved to bring about the condition of FIG. 8 and the spring force of the main take-up spring 126 comes to act, whereby the condition in which the pressure force is reduced is released. When the webbing is again rewound in a suitable position beyond said set position, that position provides a new set position. Whenever the webbing W is drawn out or rewound in the set position, the pressure force is kept in its reduced condition.

According to the second embodiment, as described above, the take-up shaft and the connecting member for connecting one part and another part of biasing means are made axially integral with each other and this eliminates occurrence of a phenomenon that the biasing means of the take-up shaft assumes an abnormal form, whereby the connecting member or the like is moved into intense frictional contact with other portion, and therefore, the retractor can always operate normally. Of course, the webbing can be smoothly drawn out without producing any unpleasant sound when the seat occupant is to wear the webbing.

We claim:

1. A retractor having a webbing take-up shaft rotatably supported by a base, biasing means for biasing said take-up shaft in a webbing take-up direction, said biasing means including plural parts, a connecting member for connecting one part and another part of said biasing means, locking means capable of assuming a locking position in which it is engaged with said connecting member to prevent the biasing force of said other part of said biasing means from acting on said take-up shaft and a non-locking position in which it is not engaged with said connecting member to permit the biasing forces of said one part and said other part of said biasing means to act on said take-up shaft, said locking means having an engaging portion, control means for controlling said locking means, means for permitting at least the engaging portion of said locking means engaged with said connecting member to move toward said non-locking position without substantially affecting said control means when a force greater than a predetermined value which tends to bring said locking means toward said non-locking position acts on said locking means after said locking means has been brought to said locking position by said control means, and a cam member movable in a predetermined range in response to movement of said take-up shaft and adapted, when said take-up shaft moves in a webbing draw-out direction, to move to one end of said predetermined range and engage said locking means in said locking position to thereby bring at least said engaging portion of said locking means to said non-locking position and, when said take-up shaft moves in the webbing take-up direction, to move to the other end of said predetermined range and to be disengaged from said locking means, said locking means including a stop spring with a first portion and a second portion and a stop lever having said engaging portion thereon, said stop spring being operatively connected to said control means, said first portion being in contact with said stop lever for bringing said stop lever into engagement with said connecting member, said second portion being in contact with said stop lever for bringing said stop lever into disengagement from said connecting member, and said permitting means including said first portion which flexes for permitting said engaging portion to move toward said non-locking position.

2. A retractor according to claim 1, wherein said control means includes a solenoid, said solenoid being operatively connected to said stop spring.

3. A retractor according to claim 1, wherein said connecting member is a cup-like shaped ratchet wheel, an outer peripheral surface of said ratchet wheel being formed with plural teeth for engaging said stop lever, and said one part of said biasing means is contained in said ratchet wheel.

4. A retractor according to claim 1, wherein said one part of said biasing means has its inner end attached to said take-up shaft and its outer end attached to said connecting member and is contained in said connecting member, and said other part of said biasing means has its inner end attached to said connecting member and its outer end attached to said base.

5. A retractor having a webbing take-up shaft rotatably supported by a base, biasing means for biasing said take-up shaft in a webbing take-up direction, said biasing means including plural parts, a connecting member for connecting one part and another part of said biasing means, said connecting member being mounted rotatably relative to said take-up shaft, means for axially fixing said connecting member relative to said take-up shaft, a locking means capable of assuming a locking position in which it is engaged with said connecting member to prevent the biasing force of said other portion of said biasing means from acting on said take-up shaft and a non-locking position in which it is disengaged from said connecting member to permit the biasing forces of said one part and said other part of said biasing means to act on said take-up shaft, control means for bringing said locking means to said locking position during the wearing of the webbing and bringing said locking means to said non-locking position during the non-wearing of the webbing, means for permitting at least an engaging portion of said locking means engaged with said connecting member to move toward said non-locking position without substantially affecting said control means when a force greater than a predetermined value which tends to bring said locking means toward said non-locking position acts on said locking means after said locking means has been brought to said locking position by said control means, and a cam member movable in a predetermined range in response to movement of said take-up shaft and adapted, when said take-up shaft moves in a webbing draw-out direction, to move to one end of said predetermined range and engage said locking means in said locking position to thereby bring at least said engaging portion of said locking means to said non-locking position and, when said take-up shaft moves in the webbing take-up direction, to move to the other end of said predetermined range and to be disengaged from said locking means, said locking means including a stop spring with a first portion and a second portion and a stop lever having said engaging portion thereon, said stop spring being operatively connected to said control means, said first portion being in contact with said stop lever for bringing said stop lever into engagement with said connecting member, said second portion being in contact with said stop lever for bringing said stop lever into disengagement from said connecting member, and said permitting means including said first portion which flexes for permitting said engaging portion to move toward said non-locking position.

6. A retractor according to claim 5, wherein said one part of said biasing means has its inner end attached to said take-up shaft and its outer end attached to said connecting member and is contained in said connecting member with a space being provided at a side of said one part axially inward of said take-up shaft, and said other part of said biasing means has its inner end attached to said connecting member and its outer end attached to said base.

7. A retractor according to claim 5, wherein said control means includes a solenoid, said solenoid being operatively connected to said stop spring.

8. A retractor according to claim 5, wherein said connecting member is a cup-like shaped ratchet wheel, an outer peripheral surface of said ratchet wheel being formed with plural teeth for engaging said stop lever, and said one part of said biasing means is contained in said ratchet wheel.

9. A retractor having a webbing take-up shaft rotatably supported by a base, first biasing means for biasing said take-up shaft in a webbing take-up direction, said biasing means including plural parts, a connecting member for connecting one part and another part of said biasing means, a stop lever having an engaging portion capable of assuming a locking position in which it is engaged with said connecting member to prevent the biasing force of said other part of said biasing means from acting on said take-up shaft and a non-locking position in which it is disengaged from said connecting member to permit the biasing forces of said one part and said other part of said biasing means to act on said take-up shaft, a stop spring having a first portion and a second portion, said first portion being in contact with said stop lever and permitting said engaging portion to move toward said non-locking position, said second portion being in contact with said stop lever for bringing said stop lever into disengagement from said connecting member, second biasing means for biasing said second portion of said stop spring in such a direction that said second portion comes into contact with said stop lever, and control means for controlling said stop lever, said control means being operatively connected to said stop spring so as to bring said stop lever selectively into engagement with or disengagement from said connecting member through said stop spring.

* * * * *